US012810075B2

(12) United States Patent
Patterson

(10) Patent No.: US 12,810,075 B2
(45) Date of Patent: Nov. 24, 2026

(54) ANOMALY DETECTION TOOL

(71) Applicant: Missionovo, LLC, Kensington, MD (US)

(72) Inventor: Brett Patterson, Aldie, VA (US)

(73) Assignee: Missionovo, LLC, Kensington, MD (US)

( * ) Notice: Subject to any disclaimer, the term of this patent is extended or adjusted under 35 U.S.C. 154(b) by 99 days.

(21) Appl. No.: 19/193,014

(22) Filed: Apr. 29, 2025

(65) Prior Publication Data

US 2025/0322163 A1 Oct. 16, 2025

Related U.S. Application Data

(60) Provisional application No. 63/634,772, filed on Apr. 16, 2024.

(51) Int. Cl.
*G06F 40/00* (2020.01)
*G06F 40/284* (2020.01)
*G06N 20/00* (2019.01)

(52) U.S. Cl.
CPC .......... *G06F 40/284* (2020.01); *G06N 20/00* (2019.01)

(58) Field of Classification Search
CPC .......... G06N 5/04; G06N 5/042; G06N 5/043; G06N 5/045; G06N 20/10; G06N 20/20; G06N 3/02; G06N 3/04; G06N 3/042; G06N 3/0442; G06N 3/044; G06N 3/043; G06N 3/0455; G06N 3/045; G06N 3/0464; G06N 3/047; G06N 3/0475; G06N 3/048;

(Continued)

(56) References Cited

U.S. PATENT DOCUMENTS 10,268,749 B1 * 4/2019 Roy ...................... G06F 16/285
11,610,061 B2 * 3/2023 Eisenschlos .......... G06F 40/253
(Continued)

OTHER PUBLICATIONS

M. Raeiszadeh, A. Ebrahimzadeh, R. H. Glitho, J. Eker and R. A. F. Mini, “Asynchronous Real-Time Federated Learning for Anomaly Detection in Microservice Cloud Applications,” in IEEE Transactions on Machine Learning in Communications and Networking, vol. 3, pp. 176-194, 2025 (Year: 2025).*

(Continued)

*Primary Examiner* — Edgar X Guerra-Erazo
(74) *Attorney, Agent, or Firm* — Michael P. Fortkort, Esq.; PROTORAE LAW PLLC

(57) ABSTRACT

Tool detects anomalies in textual data and determines event sequences normality against broader data. Representative event samples are gathered for source, and a top-level wordpiece tokenizer is built. Tokenizer is serialized and stored. Additional samples are gathered, and encodings pulled from inputs via the tokenizer. For a given variable, the algorithm either polls encodings in groups of time steps or pads encodings up to these time steps. A square matrix of observations is created, whose basis is expanded with a random matrix and added dimensions. The basis is expanded via a random projection. The matrices are then passed to a variational autoencoder. To minimize information loss when sending encodings to compressed latent space, stochastic subgradient methods are used. Upon convergence, the trained model is saved. Observed errors are bootstrapped on the holdout set. If new events fall outside tolerances set via bootstrap series is declared anomalous.

20 Claims, 4 Drawing Sheets

(58) Field of Classification Search
CPC .......... G06N 3/08; G06N 3/084; G06N 3/082; G06N 3/088; G06N 3/0895; G06N 3/09; G06N 3/091; G06N 3/092; G06N 3/094; G06N 3/096; G06N 3/098; G06N 3/0985; G06N 5/01; G06N 5/022; G06N 5/02; G06N 5/025; G06N 5/048; G06N 7/01; G06N 7/023; G06N 7/02; G06N 7/026; G06F 18/213; G06F 18/214; G06F 18/2148; G06F 18/2155; G06F 18/2163; G06F 18/23; G06F 18/232; G06F 18/23211; G06F 18/2321; G06F 18/23213; G06F 18/2323; G06F 18/2337; G06F 18/295; G06F 18/29; G06F 18/285; G06F 18/28; G06F 18/25; G06F 18/253; G06F 40/40; G06F 40/56; G06F 40/53; G06F 40/20; G06F 40/10; G06F 40/103; G06F 40/14; G06F 40/131; G06F 40/205; G06F 40/211; G06F 40/216; G06F 40/237; G06F 40/242; G06F 40/253; G06F 40/268; G06F 40/274; G06F 40/284; G06F 40/289; G06F 40/295; G06F 40/279; G06F 40/30; G06F 40/35
See application file for complete search history.

(56) References Cited

U.S. PATENT DOCUMENTS

| | | | | |
|---|---|---|---|---|
| 12,450,345 | B2 * | 10/2025 | Ezrielev | G06N 20/00 |
| 12,585,682 | B2 * | 3/2026 | Mallick | G06F 16/3329 |
| 2018/0285599 | A1 * | 10/2018 | Praveen | G06F 18/22 |
| 2021/0165960 | A1 * | 6/2021 | Eisenschlos | G06F 40/253 |
| 2023/0034136 | A1 * | 2/2023 | Chow | G06N 20/00 |
| 2024/0119075 | A1 * | 4/2024 | Mallick | G06F 16/3329 |
| 2024/0119149 | A1 * | 4/2024 | Ezrielev | G06N 20/00 |
| 2024/0259416 | A1 * | 8/2024 | Miyake | G06F 21/552 |
| 2025/0337742 | A1 * | 10/2025 | Jeffords | G06F 21/6218 |

OTHER PUBLICATIONS

Yin, Yanshang, et al. "MADGuard: A High-Performance Microservice Anomaly Detection System With Multidimensional Data Fusion and Temporal Causal Analysis." IEEE Transactions on Network and Service Management 23 (2025): 767-788. (Year: 2025).*

* cited by examiner

FIG 3 – Training Sequence

ANOMALY DETECTION TOOL

RELATED APPLICATIONS

This application claims the benefit of and priority to U.S. Provisional Patent Application No. 63/634,772 filed Apr. 16, 2024 by the same inventor, assigned to the same assignee and bearing the same title.

BACKGROUND

The present invention relates generally to tools for analyzing data, and more particularly to automated tools for analyzing data, such as large amounts of textual data, sometimes termed "big data."

The present invention is directed to the problem of developing a method and apparatus for detecting anomalies in textual data and determining the normality of event sequences against a broader data set.

SUMMARY OF THE INVENTION

The present invention solves these and other problems by providing an anomaly detection tool that employs a unique algorithm to detect anomalies in textual data and determine the normality of event sequences against a broader data set.

According to one aspect of the present invention, an exemplary embodiment of the algorithm first gathers a representative sample of events for a given source, and builds a wordpiece tokenizer on top of the sampled events. Tokenizing a text is splitting the text into words or subwords, which then are converted to ids through a look-up table. WordPiece is a subword tokenization algorithm used for BERT, DistilBERT, and Electra. The algorithm was outlined in Japanese and Korean Voice Search (Schuster et al., 2012) and is very similar to Byte-Pair Encoding (BPE). WordPiece first initializes the vocabulary to include every character present in the training data and progressively learns a given number of merge rules. In contrast to BPE, WordPiece does not choose the most frequent symbol pair, but the one that maximizes the likelihood of the training data once added to the vocabulary. A summary of different tokenizers including Wordpiece can be found on the Internet at https://huggingface.co/docs/transformers/en/tokenizer_summary. Mar. 5, 2024]. Next, the algorithm serializes and stores the tokenizer for use on new observations. The algorithm then gathers additional samples and pulls encodings from inputs via the saved tokenizer. For a given variable (e.g., host, username, etc.), the algorithm either polls encodings in groups of N time steps or pads encodings up to N time steps. Next, a square matrix of N×N observations is created. The basis is then expanded with a random matrix (N×M). Dimensions are added at dim=0,3 (1×N×M×1). The basis is further expanded via a random projection (1×1×1×M). The matrices are then passed to a variational autoencoder (VAE). A high level review of a VAE can be found here. [Kingma, Diederik P. and Welling, Max, "An Introduction to Variational Autoencoders", *Foundations and Trends in Machine Learning* 12, no. 4 (2019): 307-392]. To minimize information loss when sending encodings to compressed latent space, stochastic subgradient methods are used. [Boyd, S. and Mutapcic, A., *Stochastic Subgradient Methods*, https://see.stanford.edu/materials/lsocoee364b/04-stoch_subgrad_notes.pdf].

Upon convergence (i.e., a loss minimization threshold is reached), the trained model is then saved. Observed errors are bootstrapped on the holdout set. See Wiki on bootstrap:

[Bootstrapping (statistics). https://en.wikipedia.org/wiki/Bootstrapping_(statistics). Mar. 5, 2024]. Bootstrapping is any test or metric that uses random sampling with replacement (e.g. mimicking the sampling process), and falls under the broader class of resampling methods.

Bootstrapping assigns measures of accuracy (bias, variance, confidence intervals, prediction error, etc.) to sample estimates. This technique allows estimation of the empirical distribution of almost any statistic using random sampling methods. Bootstrapping estimates the properties of an estimand (such as its variance) by measuring those properties via sampling from an empirical distribution. In the case where a set of observations can be assumed to be from an independent and identically distributed population, this can be implemented by constructing a number of resamples with replacement, of the observed data set (and of equal size to the observed data set). It may also be used for constructing hypothesis tests. It is often used as an alternative to statistical inference based on the assumption of a parametric model when that assumption is in doubt, or where parametric inference is impossible or requires complicated formulas for the calculation of standard errors.

The bootstrap results are then saved. If new events fall outside tolerances set via bootstrap then the series is declared anomalous.

According to another aspect of the present invention, an apparatus for implementing the above process includes a client, router, worker nodes, a database and a user interface. The client submits data to the router, which distributes the load across the worker nodes. The processed data is then sent to the database and summary data is provided to the user interface.

The present invention provides a comprehensive framework for developing an anomaly detection tool. The design ensures robust data security and optimal performance.

According to another aspect of the present invention, an exemplary embodiment uses a filtering layer in front of the model that clusters the incoming observations such that series are compared to a similar peer group as opposed to comparing everything uniformly.

According to yet another aspect of the present invention, an exemplary embodiment of a filtering layer transforms the inputs into numeric vectors using a beta variational autoencoder. In this exemplary embodiment, encoded values (i.e., outputs from the embedder) are then sent to the clustering algorithm for training. An optimal number of clusters is chosen using a sample. Between the cluster separation and the distribution of samples within each cluster is used to determine cluster size. Optionally, one can skip this step and select a reasonable estimate for the number of clusters.

One technique uses standard K-Means clustering to build out cluster centers. Iteratively, centroids are calculated based on elements assigned to a specific cluster. This process is repeated until no members are reassigned after a given pass. The assigned cluster becomes a one-hot encoded value that is passed to the event for processing by the autoencoder.

According to still another aspect of the present invention, an exemplary embodiment employs a mechanism for caching the output from the encoder so that series can be compared to their peers over windows of time and malicious and interesting events can be pulled based on how close they are to other members of the population of interest.

In this embodiment for caching vector outputs, an autoencoder creates a latent space once the input has passed through the encoder. In other embodiments, this output is then passed directly to the decoder for classification. But in this aspect of the present invention, the latent space is saved to a separate table. Saving the latent space allows users to leverage approximate nearest neighbor search. Approximate nearest neighbors allows for comparison between events of interest with the entire set of observed values. This process creates a knowledge base that can be leveraged for making meaningful connections between seemingly disparate events that cannot be captured by other means.

According to yet another aspect of the present invention, in the above exemplary embodiments a training sequence may be employed along with an inference sequence.

According to this aspect of the present invention, the training sequence may include worker nodes; an initial encoder that is trained to be a shallow representation of said final encoder; and a manager node. This manager node: (i) tallies a number of events of a given new source type; (ii) draws a representative sample from an overall population of events after waiting for a predetermined number of observations to pass through; (iii) designates one of the worker nodes as a training node; and (iv) passes the event identifiers for the representative sample as a training sample to the training node. A cluster assignment algorithm processor is included to: (i) receive embeddings from the initial encoder; (ii) split a population into clusters; and (iii) provide the clusters as inputs to the final encoder thereby allowing for more accurate comparison. The model details are then passed to the database for storage and retrieval by other worker nodes.

According to another this aspect of the present invention, the inference sequence may include worker nodes; an initial autoencoder to generate embeddings; a cluster assignment algorithm processor to receive the embeddings and assign clusters based on embedding space; a final encoder to receive events; and a manager node that polls the database on regular intervals for new event identifiers. This manager node passes new identifiers to the worker nodes. The worker nodes pull event details from the database by the passed event identifiers and send the event details to the initial autoencoder, in which the embeddings are generated for cluster assignment by a cluster assignment algorithm processor. Predictions are then made based on a latent space as to whether an event is anomalous or not for a specific source type and cluster. Model details are then passed to the database for storage and retrieval by others of the plurality of worker nodes. Predictions are passed to the database for long term storage.

According to still another aspect of the present invention, in the above exemplary methods, the following steps may be used to perform a training sequence: (i) training an initial encoder to be a shallow representation of a final encoder; (ii) tallying a number of events of a given new source type; (iii) drawing a representative sample from an overall population of events after waiting for a predetermined number of observations to pass through; (iv) designating one of the worker nodes as a training node; (v) passing event identifiers for the representative sample as a training sample to the training node; (vi) receiving embeddings from the initial encoder; (vii) splitting a population into clusters; and (viii) using the clusters as inputs to a final encoder thereby allowing for more accurate comparison. The model details can then be passed to the database for storage and retrieval by other worker nodes.

According to yet another aspect of the present invention, in the above exemplary methods, the following steps may be used to perform an inference sequence: (i) using an initial autoencoder to generate embeddings; (ii) assigning clusters based on an embedding space; (iii) using a final encoder to receive events; (iv) polling the database on regular intervals for new event identifiers by a manager node; (v) passing new event identifiers to worker nodes by the manager node; (vi) pulling by the worker nodes event details from the database by the passed event identifiers; (vii) sending the event details to the initial autoencoder; and (viii) making predictions based on a latent space as to whether an event is anomalous or not for a specific source type and cluster. The anomalies may then be displayed via a graphical user interface. The predictions may be stored in the database for longer term storage.

According to still another aspect of the present invention, the above methods may be stored as instructions for one or more processors in non-transitive computer readable media, which instructions cause the one or more processors to process event data to detect anomalies in textual data by performing any of the above methods.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION

Figure 1:
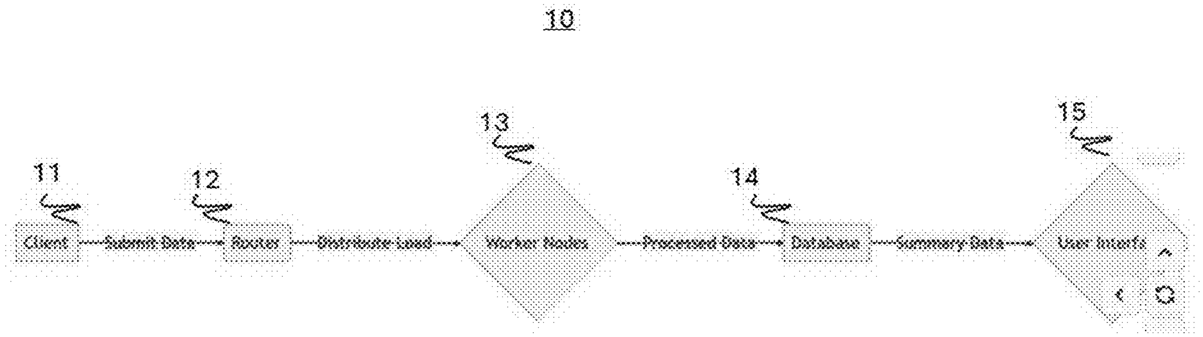
FIG. 1 depicts an exemplary embodiment of an architecture of an apparatus for detecting anomalies in accordance with one aspect of the present invention.

This present invention provides an anomaly detection tool tailored to analyze text data and determine the normality of event sequences against a broader dataset. Turning to FIG. 1, an architecture of an exemplary embodiment of the anomaly detection tool 10 is shown therein. The anomaly detection tool includes at least a client 11, router 12, one or more worker nodes 13, a database 14 and a user interface 15. The client 11 submits data to the router 12, which distributes the load across the worker nodes 13. The processed data is then sent to the database 14 and summary data is provided to the user interface 15. This architecture is one possible implementation, but various aspects of the routers, worker nodes, client, and database could be implemented as distributed or multiple ones of each.

The anomaly detection tool includes a router 12 which receives event data from clients and routes it to worker nodes. The router preferably ensures efficient load distribution concomitant with high availability. A robust router service is used to handle incoming data traffic. For load balancing, the router should effectively distribute incoming requests to prevent overloading. For scalability purposes, the system is designed to support scaling both vertically and horizontally.

The anomaly detection tool includes worker nodes 13 to process incoming events and execute anomaly detection algorithms of the present invention. To do so, these worker nodes 13 include Rust based services equipped with machine learning models for anomaly detection.

The anomaly detection tool includes a database 14 to store and manage the data necessary for analysis and to retain the results. Preferably, the database emphasizes data security, integrity and swift read-write operations. One type of database useful for this implementation is a ClickHouse database for structured data and large-scale unstructured data. For security, data encryption is employed for both data at rest and in transit, routine backups are required along with stringent access controls.

The front end user interface 15 serves as the presentation layer where users view anomalous events. Preferably, the user interface 15 is user-friendly, secure, and focused on providing a smooth experience. The user interface employs HTML5, CSS3, and React.js. Moreover, for security the user interface implements HTTPS, input sanitization, and CSRF protection.

For data security, AES-256 may be employed for encrypting data at rest and TLS protocols may be used for securing data in transit. Also, role-based access control systems should be implemented across all components for security reasons. For data compliance, one must adhere to GDR CCPA and other relevant data protection regulations.

For monitoring, the system allows for tools like Prometheus and Grafana to be used by outputting sufficient metrics and traces for real-time system monitoring.

The exemplary embodiment of the algorithm first gathers a representative sample of events for a given source, and builds a Wordpiece tokenizer on top of the sampled events. A summary of different tokenizers including Wordpiece can be found, such as: [Summary of the tokenizers. https://huggingface.co/docs/transformers/en/tokenizer_summary. Mar. 5, 2024]. Next, the algorithm serializes and stores the tokenizer for use on new observations. The algorithm then gather additional samples and pulls encodings from inputs via the saved tokenizer. For a given variable (e.g., host, username, etc.), the algorithm either polls encodings in groups of N time steps or pads encodings up to N time steps. Next, a square matrix of N×N observations is created. The basis is then expanded with a random matrix (N×M). Dimensions are added at dim=0,3 (1×N×M×1). The basis is further expanded via a random projection (1×1×1×M). The matrices are then passed to a variational autoencoder (VAE). A high level review of a VAE can be found here. [Kingma, Diederik P. and Welling, Max, "An Introduction to Variational Autoencoders", *Foundations and Trends in Machine Learning* 12, no. 4 (2019):307-392]. To minimize information loss when sending encodings to compressed latent space stochastic subgradient methods are used. [describe or cite]. Upon convergence (i.e., a loss minimization threshold is reached), the trained model is then saved. Observed errors are bootstrapped on the holdout set. See Wiki on bootstrap: [Bootstrapping (statistics). https://en.wikipedia.org/wiki/Bootstrapping_(statistics). Mar. 5, 2024]. The bootstrap results are then saved. If new events fall outside tolerances set via bootstrap declare series as anomalous.

Figure 2:
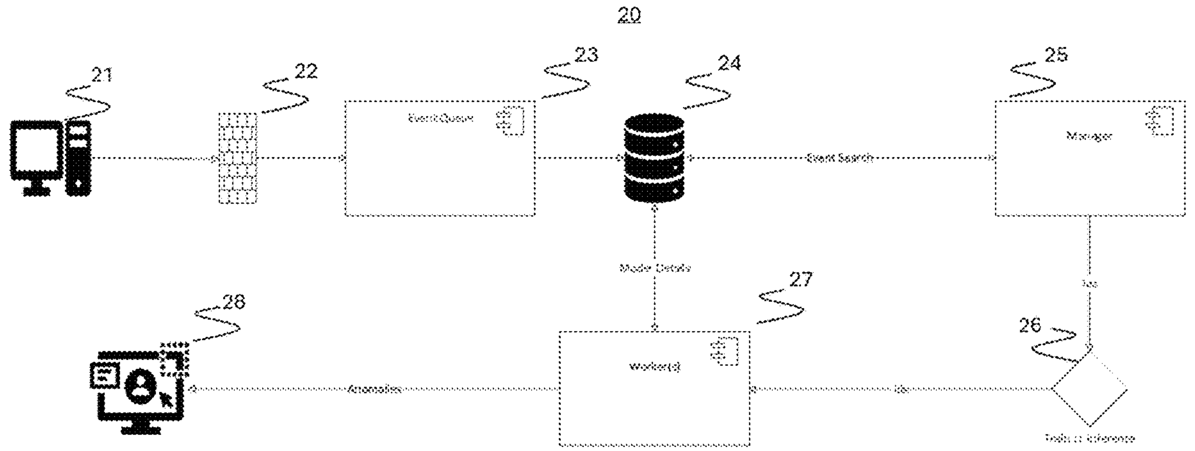
FIG. 2 depicts another exemplary embodiment of an architecture of an apparatus for detecting anomalies in accordance with another aspect of the present invention.

Turning to FIG. 2, shown therein is an overview of a process 20 for performing the methods set forth herein for anomaly detection. An application (such as a Troller client) executing on a desktop computer 21 (or other handheld, laptop or server) connects through an application firewall/load balancer 22 and populates the event queuing system 23 with events, the event queueing system is coupled to a storage or database management system 24 that stores and maintains the events. Queued events are pulled into the database management system 24. A manager application 25 is coupled to the database management system 24 for searching events. A management node 25 polls the database management system 24 for new events and determines if a specific source type has a trained model. Model details are sent to the database 24 for storage once training is complete. If there is no trained model, a worker 27 is designated as the trainer and the training loop begins. One or more worker applications 27 are coupled to the storage 24 via which model details are communicated. A training process 30 or inference process 40 (see FIGS. 3, 4, respectively) receives identifiers and outputs them to the worker application 27, which then in turn outputs the anomalies to a display 28 or other computer for subsequent processing or analysis. Event identifiers are passed to worker nodes 27, and the inference loop begins. Predictions are sent to the database, and anomalies are displayed at the user interface.

Figure 3:
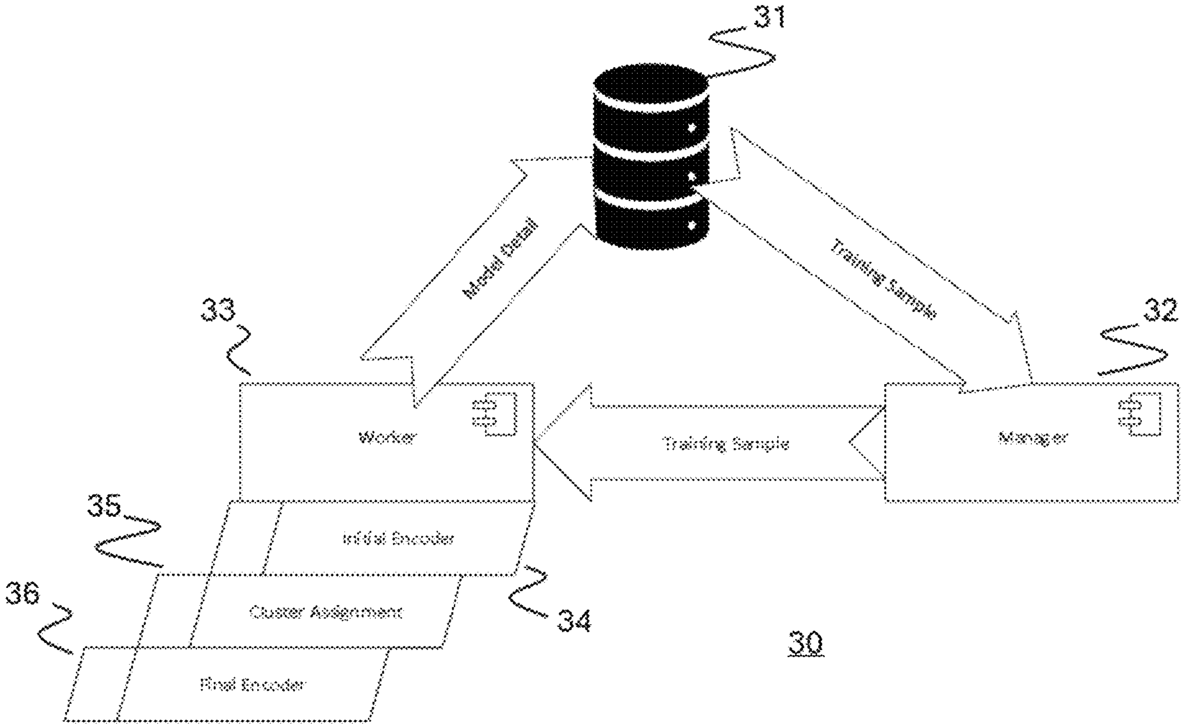
FIG. 3 depicts an exemplary embodiment of a training sequence used in the above exemplary embodiments for detecting anomalies in accordance with still another aspect of the present invention.

Turning to FIG. 3, shown therein is an exemplary embodiment of a training sequence 30 according to another aspect of the present invention. Management node 32 begins to tally the number of events of a given new source type. After enough observations have passed through the system a representative sample is drawn from the overall population by the management node 32. A single worker node 33 is designated as the training node by the manager 32. The event identifiers for the training sample are passed to the worker node 33. An initial autoencoder 34 is trained that is a shallow representation of the final encoder 36. The embeddings from the initial autoencoder 34 are passed to a clustering algorithm 35 that split the population into multiple groups. The clusters are then used as inputs to the final autoencoder 36 allowing for more accurate comparison. Model details are then passed to the database 31 for storage and retrieval by the other worker nodes.

Figure 4:
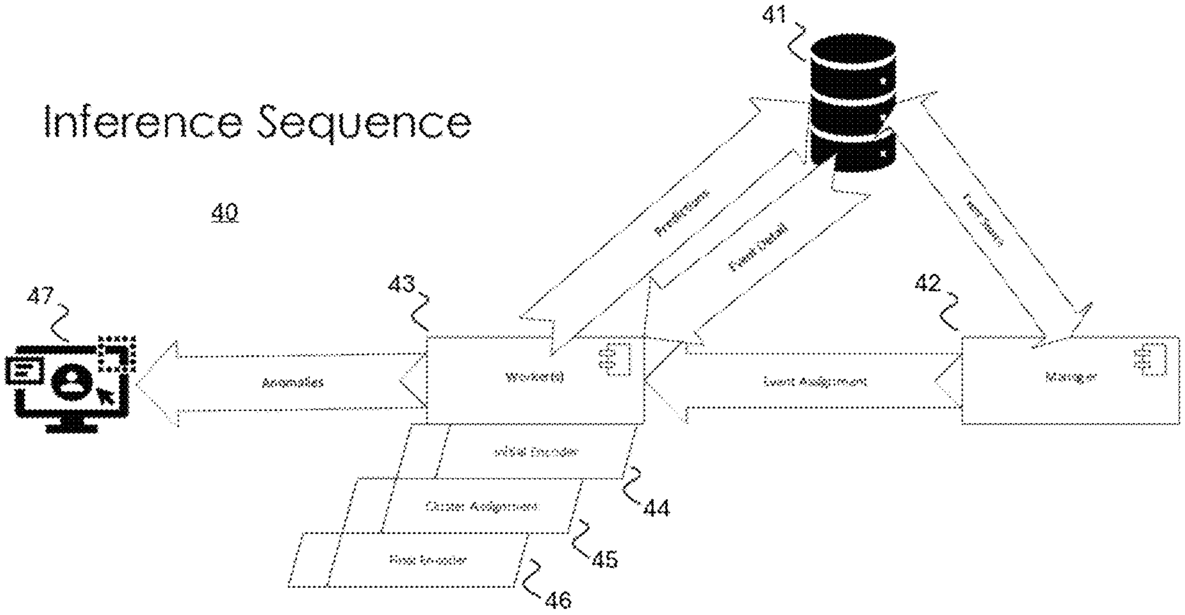
FIG. 4 depicts an exemplary embodiment of an inference sequence used in the above exemplary embodiments for detecting anomalies in accordance with still another aspect of the present invention.

Turning to FIG. 4, shown therein is an exemplary embodiment of an inference sequence 40 according to still another aspect of the present invention. Manager node 42 polls the database 41 on a regular interval for new event identifiers. New identifiers are passed to one or more workers 43. Workers 43 pull event details from the database 41 by the passed event identifiers. Event details are sent through the initial autoencoder 44 where embeddings are generated for cluster assignment 45. Cluster assignment 45 is made based on the embedding space. Events are passed to the final autoencoder 46. Predictions are then made based on the latent space as to whether the event is anomalous or not for that specific source type and cluster. Anomalies are then displayed at the user interface 47. All predictions are passed to the database 41 for longer term storage.

What is claimed is:

1. An apparatus for detecting anomalies in textual data comprising:

a client outputting event data;

one or more worker nodes to process event data and to execute an anomaly detection algorithm employing machine learning models;

a router coupled to the client to receive said event data from the client and to distribute said event data across the one or more worker nodes;

a database receiving processed data from the one or more worker nodes and outputting summary data;

a front end user interface to serve as a presentation layer where users view anomalous events;

said one or more worker modes processing data by:

a) gathering a plurality of representative samples of events for a given source;

b) building a wordpiece tokenizer on top of said plurality of representative samples of events;
c) serializing and storing the wordpiece tokenizer for use on new observations;
d) gathering additional samples;
e) pulling encodings from inputs via the saved wordpiece tokenizer;
f) for a given variable polling encodings in groups of N time steps or padding encodings up to N time steps;
g) creating a square matrix of N×N observations;
h) expanding a basis with a random matrix (N×M);
i) adding one or more dimensions at dim=0,3 (1×N×M×1);
j) further expanding the basis via a random projection (1×1×1×M);
k) passing a resulting matrices to a variational autoencoder;
l) employing stochastic subgradient methods to minimize information loss when sending encodings to compressed latent space;
m) saving a trained model upon convergence;
n) bootstrapping a plurality of observed errors on a holdout set;
o) saving a plurality of bootstrap results; and
p) declaring a series as anomalous if new events fall outside tolerances set via bootstrap.

2. The apparatus according to claim 1, further comprising a training sequence system.

3. The apparatus according to claim 2, wherein the training sequence system comprises:
a plurality of one or more worker nodes;
an initial encoder is trained to be a shallow representation of said final encoder;
a final encoder;
a manager node to: (i) tally a number of events of a given new source type; (ii) draw a representative sample from an overall population of events after waiting for a predetermined number of observations to pass through; (iii) designate one of the plurality of worker nodes as a training node; (iv) pass the event identifiers for the representative sample as a training sample to the training node;
a cluster assignment algorithm processor to: (i) receive one or more embeddings from the initial encoder; (ii) split a population into a plurality of clusters; and (iii) provide the plurality of clusters as inputs to the final encoder thereby allowing for more accurate comparison.

4. The apparatus according to claim 3, wherein a plurality of model details are then passed to the database for storage and retrieval by others of the plurality of worker nodes.

5. The apparatus according to claim 1, further comprising an inference sequence system.

6. The apparatus according to claim 5, wherein the inference sequence system comprises:
a plurality of worker nodes;
an initial autoencoder to generate one or more embeddings;
a cluster assignment algorithm processor to receive the one or more embeddings and assign clusters based on an embedding space;
a final encoder to receive one or more events;
a manager node that polls the database on regular intervals for new event identifiers;
said manager node passing new identifiers to the plurality of worker nodes;
said plurality of worker nodes pulling one or more event details from the database by the passed event identifiers and sending the one or more event details to the initial autoencoder, in which said one or more embeddings are generated for cluster assignment by the cluster assignment algorithm processor;
wherein one or more predictions are then made based on a latent space as to whether an event is anomalous or not for a specific source type and cluster.

7. The apparatus according to claim 6, wherein a plurality of model details are then passed to the database for storage and retrieval by others of the plurality of worker nodes.

8. The apparatus according to claim 6, wherein said one or more predictions are passed to the database for long term storage.

9. The apparatus according to claim 1, further comprising an inference sequence and a training sequence.

10. A method for processing event data to detect anomalies in textual data comprising:
a) gathering a plurality of representative samples of events for a given source;
b) building a wordpiece tokenizer on top of said plurality of representative samples of events;
c) serializing and storing the wordpiece tokenizer for use on new observations;
d) gathering additional samples;
e) pulling encodings from inputs via the saved wordpiece tokenizer;
f) for a given variable polling encodings in groups of N time steps or padding encodings up to N time steps;
g) creating a square matrix of N×N observations;
h) expanding a basis expanded with a random matrix (N×M);
i) adding one or more dimensions at dim=0,3 (1×N×M×1);
j) further expanding the basis via a random projection (1×1×1×M);
k) passing a resulting matrices to a variational autoencoder;
l) employing stochastic subgradient methods to minimize information loss when sending encodings to compressed latent space;
m) saving a trained model upon convergence;
n) bootstrapping a plurality of observed errors on a holdout set;
o) saving a plurality of bootstrap results; and
p) declaring a series as anomalous if new events fall outside tolerances set via bootstrap.

11. The method according to claim 10, further comprising:
training an initial encoder to be a shallow representation of a final encoder;
tallying a number of events of a given new source type;
drawing a representative sample from an overall population of events after waiting for a predetermined number of observations to pass through
designating one of a plurality of worker nodes as a training node;
passing one or more event identifiers for the representative sample as a training sample to the training node;
receiving one or more embeddings from the initial encoder;
splitting a population into a plurality of clusters;
using the plurality of clusters as inputs to a final encoder thereby allowing for more accurate comparison.

12. The method according to claim 11, further comprising:

passing a plurality of model details to the database for storage and retrieval by others of the plurality of worker nodes.

13. The method according to claim 10, further comprising:

using an initial autoencoder to generate one or more embeddings;

assigning clusters based on an embedding space based on the one or more embeddings;

using a final encoder to receive one or more events;

polling the database on regular intervals for new event identifiers by a manager node;

passing new event identifiers by said manager node to a plurality of worker nodes;

pulling by said plurality of worker nodes one or more event details from the database by the passed event identifiers;

sending the one or more event details to the initial autoencoder;

making one or more predictions based on a latent space as to whether an event is anomalous or not for a specific source type and cluster.

14. The method according to claim 13, further comprising:

displaying anomalies via a user interface.

15. The method according to claim 14, further comprising:

storing said one or more predictions in the database for longer term storage.

16. A non-transitive computer readable media having encoded thereon instructions for one or more processors to process event data to detect anomalies in textual data by performing a plurality of steps including:

a) gathering a plurality of representative samples of events for a given source;

b) building a wordpiece tokenizer on top of said plurality of representative samples of events;

c) serializing and storing the wordpiece tokenizer for use on new observations;

d) gathering additional samples;

e) pulling encodings from inputs via the saved wordpiece tokenizer;

f) for a given variable polling encodings in groups of N time steps or padding encodings up to N time steps;

g) creating a square matrix of N×N observations;

h) expanding a basis expanded with a random matrix (N×M);

i) adding one or more dimensions at dim=0,3 (1×N×M×1);

j) further expanding the basis via a random projection (1×1×1×M);

k) passing a resulting matrices to a variational autoencoder;

l) employing stochastic subgradient methods to minimize information loss when sending encodings to compressed latent space;

m) saving a trained model upon convergence;

n) bootstrapping a plurality of observed errors on a holdout set;

o) saving a plurality of bootstrap results; and p) declaring a series as anomalous if new events fall outside tolerances set via bootstrap.

17. The non-transitive computer readable media according to claim 16, wherein said plurality of steps further comprises:

training an initial encoder to be a shallow representation of a final encoder;

tallying a number of events of a given new source type;

drawing a representative sample from an overall population of events after waiting for a predetermined number of observations to pass through designating one of a plurality of worker nodes as a training node;

passing one or more event identifiers for the representative sample as a training sample to the training node;

receiving one or more embeddings from the initial encoder;

splitting a population into a plurality of clusters;

using the plurality of clusters as inputs to a final encoder thereby allowing for more accurate comparison.

18. The non-transitive computer readable media according to claim 17, wherein said plurality of steps further comprises:

passing a plurality of model details to the database for storage and retrieval by others of the plurality of worker nodes.

19. The non-transitive computer readable media according to claim 16, wherein said plurality of steps further comprises:

using an initial autoencoder to generate one or more embeddings;

assigning clusters based on an embedding space based on the one or more embeddings;

using a final encoder to receive one or more events;

polling the database on regular intervals for new event identifiers by a manager node;

passing new event identifiers by said manager node to a plurality of worker nodes;

pulling by said plurality of worker nodes one or more event details from the database by the passed event identifiers;

sending the one or more event details to the initial autoencoder; and making one or more predictions based on a latent space as to whether an event is anomalous or not for a specific source type and cluster.

20. The non-transitive computer readable media according to claim 19, wherein said plurality of steps further comprises:

displaying anomalies via a user interface; and storing said one or more predictions in the database for longer term storage.

* * * * *